(12) United States Patent
Markert

(10) Patent No.: US 9,718,316 B2
(45) Date of Patent: Aug. 1, 2017

(54) UNIVERSAL MONITORING DEVICE FOR VEHICLE TIRES

(71) Applicant: Alligator Ventilfabrik GmbH, Giengen (DE)

(72) Inventor: Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 0 days.

(21) Appl. No.: 14/765,521

(22) PCT Filed: Dec. 17, 2013

(86) PCT No.: PCT/EP2013/076918
§ 371 (c)(1),
(2) Date: Aug. 3, 2015

(87) PCT Pub. No.: WO2014/117903
PCT Pub. Date: Aug. 7, 2014

(65) Prior Publication Data
US 2015/0375580 A1    Dec. 31, 2015

(30) Foreign Application Priority Data

Feb. 4, 2013   (DE) ........................ 10 2013 001 837

(51) Int. Cl.
G05B 23/02    (2006.01)
B60C 23/04    (2006.01)
G05B 15/02    (2006.01)

(52) U.S. Cl.
CPC ...... B60C 23/0455 (2013.01); B60C 23/0462 (2013.01); B60C 23/0471 (2013.01); B60C 23/0479 (2013.01); G05B 15/02 (2013.01)

(58) Field of Classification Search
CPC ............ B60C 23/0455; B60C 23/0471; B60C 23/0462; B60C 23/0479; G05B 15/02
See application file for complete search history.

(56) References Cited

U.S. PATENT DOCUMENTS

| 7,518,495 B2 | 4/2009 | Tang et al. |
| 2004/0017291 A1 | 1/2004 | Hardman et al. |

(Continued)

FOREIGN PATENT DOCUMENTS

| DE | 20 2004 021 911 | 8/2012 |
| EP | 1 826 029 | 8/2007 |

OTHER PUBLICATIONS

International Search Report dated Feb. 26, 2014 in PCT International Application No. PCT/EP2013/076918.

*Primary Examiner* — Erin File
(74) *Attorney, Agent, or Firm* — Faegre Baker Daniels LLP

(57) ABSTRACT

The invention relates to a universal monitoring device for monitoring one or several state variables of a vehicle tire, comprising
  at least one sensor for detecting a state variable of the vehicle tire;
  at least one transmitter for transmitting a wireless coded signal depending on the detected state variable;
  at least one control apparatus which is in connection with the sensor and the transmitter in order to control the detection of the state variable and the transmission of the signal, wherein
  a memory is assigned to the control apparatus or is integrated therein, in which a computer program which is executable by the control apparatus is stored, which controls the detection of the state variable and the transmission of the signal.

(Continued)

The invention is characterized in that the computer program comprises a plurality of functional modules which can be activated individually or in groups and which are designed to change the content and the coding of the signal to be transmitted depending on their activation or deactivation, a receiver is assigned to the control apparatus for receiving a parameter set, the memory is designed for storing the parameter set received by the receiver, and the computer program is designed to activate and deactivate its functional modules depending on parameters of the stored parameter set, and to determine the change in the content and the coding of the signal to be transmitted by the functional modules depending on parameters of the stored parameter set.

20 Claims, 1 Drawing Sheet

(56) References Cited

U.S. PATENT DOCUMENTS

| | | | |
|---|---|---|---|
| 2005/0104722 A1* | 5/2005 | Tang | B60C 23/0471 340/445 |
| 2006/0103240 A1* | 5/2006 | Naito | B60C 23/0408 307/10.1 |
| 2006/0195233 A1* | 8/2006 | Ogawa | B60C 23/0408 701/2 |
| 2007/0271014 A1* | 11/2007 | Breed | B60J 10/00 701/31.9 |
| 2009/0072959 A1* | 3/2009 | Matsumura | B60C 23/0433 340/447 |
| 2009/0224900 A1 | 9/2009 | Shimura | |
| 2010/0019881 A1* | 1/2010 | Shimura | B60C 23/007 340/10.1 |
| 2011/0054337 A1* | 3/2011 | Lupano | A61B 5/0006 600/523 |
| 2011/0246101 A1* | 10/2011 | Araki | B60C 23/044 702/50 |
| 2012/0119895 A1* | 5/2012 | Deniau | B60C 23/0408 340/442 |
| 2014/0210641 A1* | 7/2014 | Hammerschmidt | G08C 19/16 340/870.19 |
| 2016/0185166 A1* | 6/2016 | Huang | B60C 23/0476 73/146.4 |
| 2016/0239937 A1* | 8/2016 | Kim | G06T 1/20 |

* cited by examiner

UNIVERSAL MONITORING DEVICE FOR VEHICLE TIRES

CROSS-REFERENCE TO RELATED APPLICATION

The present application is a National Stage of International Application No. PCT/EP2013/076918, filed Dec. 17, 2013, which claims priority to German Application No. 10 2013 001 837.4, filed Feb. 4, 2013, the entire disclosures of which are hereby expressly incorporated herein by reference.

The present invention relates to a monitoring device for monitoring one or more state variables of a vehicle tire, and a method for the configuration of a universal monitoring device for monitoring one or several state variables of a vehicle tire, specifically according to the preambles of the claims 1 and 12.

It is common practice in modern vehicles and increasingly demanded in various countries that at least the pressure of the vehicle tires mounted on the vehicle is monitored as a state variable. For this purpose, a monitoring device is provided in a so-called active system in the air-filled space of the tire, which comprises a sensor for detecting the pressure and a transmitter for transmitting a signal dependent on the detected pressure to a receiving device within the vehicle or the vehicle control unit, so that the driver can be informed about a tire pressure that is too low. In order to control the detection of the tire pressure with the sensor and the transmission of the signals by the transmitter, the monitoring device in the vehicle tire comprises a control apparatus with a computer program stored in said control apparatus, which computer program is executed by the control apparatus and determines the functionality of the control unit.

Since the monitoring devices need to communicate with the receiving devices in the various types of vehicles of the different vehicle manufacturers, it is determined in advance for each monitoring device which signal it needs to emit so that it can be processed correctly by the receiving device. It needs to be determined in detail which content and coding the signal needs to comprise, i.e. which is state variables and which further information needs to be contained in the signal (content) and at what position and with which length (e.g. bit length) they are to be found in the signal (coding). Although identical or very similar hardware was used, the computer programs stored in the control apparatuses of the monitoring devices therefore differed from each other in the past, depending on the monitoring device to be used for a type of vehicle. Each computer program adjusts the content and the coding of the signal to the respective software in the receiving device of the vehicle of the respective vehicle type, wherein the computer program is either programmed in the control apparatus already during the production of the monitoring device or—as proposed in the German utility model DE 20 2004 021 911 U1—at a later time by a fitter or spare parts supplier.

In accordance with DE 20 2004 021 911 U1, later programming or reprogramming of the computer program in the control apparatus is intended to reduce the scope of spares inventory, because as a result of the programming of the control apparatus it is not necessary to use already programmed monitoring devices directly before inserting the monitoring device into the vehicle tire of a specific type of vehicle, which otherwise would have to be kept on stock with different programmes for the different types of vehicles. Instead of the transmission of the entire executable computer program into the memory of the control apparatus, the aforementioned utility model further proposes to program several producer codes in the memory of the control apparatus during the production of the monitoring device, i.e. an executable computer program stored in the memory for each producer, which is adjusted to the respective vehicle type of the producer. As a result of the transmission of a program signal, precisely one of said different computer programs can be selected, according to which the control apparatus will then operate.

The first alternative leads to the disadvantage that the complete programming of the control apparatus by the fitter or spare parts supplier needs a considerable amount of time. As a result, a program duration of approximately 1 to 2 minutes per tire pressure monitoring device must be expected in the case of modern transmission technology for example, which will quickly add up to 5 minutes or more in the case of four wheels per vehicle. This increases the required service time during the exchange of all wheels of a vehicle by proximity 50%, which is disadvantageous.

In the case of the second alternative, according to which the different programs of the various producers are already programmed in the control apparatus and it is only necessary to select one of these programs, there is the advantage of a shorter period of time in the selection of the computer program, but the usability of the monitoring device is limited by the use of individual unchangeable computer programs to the previously programmed types of vehicles and a signal format that is connected thereto.

US 2012/0119895 A1 describes a programming system for a tire pressure monitoring device with a programming device which is capable of providing information which of a plurality of transmission protocols is used by a transmitter/receiver of a tire pressure monitoring device.

The present invention is based on the object of providing a universal monitoring device for monitoring one or several state variables of a vehicle tire, which offers especially great flexibility in the adjustment to different receiving devices in the vehicle and simultaneously minimises the necessary installation time. Furthermore, a method shall be provided for the configuration of such a monitoring device.

The object in accordance with the invention is achieved by a universal monitoring device with the features of claim 1 and a method for the configuration of a universal monitoring device with the features of claim 12. Advantageous and especially appropriate embodiments of the invention are provided in the dependent claims.

A solution for the production or configuration of a universal monitoring device is provided by the invention, which is as flexible as the known complete transmission of the entire computer program into the memory of the monitoring device on site, but which simultaneously makes do with a fraction of the transmission duration. Instead of the transmission of a compiled executable program code into the memory of the control apparatus of the monitoring device, only a parameter set is transmitted to the monitoring device and stored in its memory. Since the executable computer program which is stored in the monitoring device and which controls the detection of the state variable and the transmission of the signal comprises a plurality of different functional modules which can be activated individually or in groups and whose operating mode is only determined by the parameter set stored in the memory, an especially high level of flexibility can be achieved on the one hand in the detection of one or several state variables of the vehicle tire and on the other hand in the production or coding that is adjusted specifically to the vehicle and the transmission of the signal describing the detected state variable.

The computer program with the different functional modules which is permanently stored in the memory of the computer apparatus or a memory assigned to said control apparatus can also be referred to as the master software, which is virtually completely identical in each application of the universal monitoring device. The parameter set however varies depending on the respective vehicle specific application.

Since the parameter set requires substantially less memory than the master software, it can be transmitted especially rapidly from a configuration device which is provided in a workshop of the vehicle manufacturer, service partner or tire service for example to the memory of the universal monitoring device, especially in a wireless manner. The master software on the other hand can already be programmed into the memory during the production of the universal monitoring device, e.g. in a production line, either in a wireless manner or also through respective electrical contacts for achieving an especially high programming speed.

The programming of the executable computer program in the control apparatus, i.e. the so-called master software, during the production does not mean that it cannot be subsequently reprogrammed or over-programmed in order to set up new functional modules or edit existing functional modules. This will usually only be necessary in greater time intervals for so-called software updates in existing systems and not directly during a tire service.

The executable computer program (master software) stored in the memory of the monitoring device advantageously contains all principal functional module in order to realise an application-specific software for all required monitoring devices situated on the market, which are also known as tire pressure sensors in the monitoring of the tire pressure. Every single functional module can be used or not depending on the application, in that it is activated or deactivated by a parameter of the stored parameter set. If a functional module is used, further parameters from the parameter set can advantageously define the behaviour of the functional module.

In detail, a universal monitoring device in accordance with the invention for monitoring one or several state variables of a vehicle tire comprises at least one sensor for detecting a state variable of the vehicle tire, e.g. the air pressure or the temperature. At least one transmitter is provided for transmitting a wireless coded signal depending on the detected state variable, were the coding shall be understood as the application-specific integration of a value dependent on the detected state variable into the analog or advantageously digital signal.

The monitoring device in accordance with the invention further comprises a control apparatus which is in connection with the sensor and the transmitter in order to control the detection of the state variable and the transmission of the signal, wherein a memory is assigned to the control apparatus or is integrated therein, in which a computer program that is executable by the control apparatus and was previously also designated as the master software is stored, which controls the detection of the state variable and the transmission of the signal.

In accordance with the invention, the computer program comprises a plurality of functional modules which can be activated individually or in groups and which are designed to change the content and the coding of the signal to be transmitted depending on their activation or deactivation in order to thus allow adjusting the signal to the requirements of a receiver evaluating the signal, especially within the vehicle, e.g. in the vehicle control unit, so that the monitoring device can be used in different vehicle systems of different producers.

In accordance with the invention, the control apparatus is assigned a receiver for receiving a parameter set, wherein the receiver can be provided within the control apparatus or outside thereof. Furthermore, the memory of the control apparatus is designed for storing the parameter set received by the receiver, and the computer program which is stored in the memory and can be executed by the control apparatus is designed to activate and deactivate its functional module depending on parameters of the stored parameter set and to determine the change in the content and the coding of the signal to be transmitted as performed by the functional modules depending on parameters of the stored parameter set.

An advantageous embodiment provides that the computer program is designed to activate at least two of its functional modules depending on the stored parameter set, which means that during the use of the universal monitoring device at least two functional modules are always active and thus determine the content and the coding of the signal transmitted by the monitoring device by means of the transmitter.

The parameter set comprises one or several parameters for example which determine the position of a value of a state variable detected by the sensor in the signal to be transmitted.

The parameter set can comprise one or several parameters which determine the bit length of a value of a state variable detected by the sensor in the signal to be transmitted.

One embodiment of the invention provides that the parameter set comprises one or several parameters which determine a transmission interval and/or a bit transmission speed of the signal to be transmitted.

It is advantageous if the parameter set comprises one or several parameters which determine a detection interval for detecting a state variable by the sensor.

Examples for functional modules of the universal monitoring device are the following:
 a functional module for controlling the detection of the air pressure in the vehicle tire and the transmission of a pressure value dependent thereon;
 a functional module for controlling the detection of a temperature in the vehicle tire and the transmission of a temperature value dependent thereon;
 a functional module for controlling the power output of an electric battery integrated in the monitoring device;
 a functional module for controlling time logging;
 a functional module for controlling the coding, the transmission interval, the bit transmission speed and/or the modulation of the signal to be transmitted;
 a functional module for controlling the transmission of state values, identification values and/or limit values for the state variable which are stored in the parameter set.

Examples for state values stored in the parameter set are for example the size of the tire, the contact area of the tire, lateral forces and other tire state variables of the tire in which the universal monitoring device is used.

According to an advantageous embodiment in accordance with the invention, an acceleration sensor is assigned to or integrated in the monitoring device, which acceleration sensor detects the direction of acceleration of the monitoring device. Furthermore, a functional module is provided for controlling the detection of the direction of acceleration with the acceleration sensor and for transmitting a value dependent thereon by means of the transmitter. This allows the monitoring device to determine automatically on which side of the travelling direction it is installed in a vehicle tire. At the same time, further variables can be detected, e.g. the rotational speed or frequency of the tire, in order to determine whether the monitoring device is integrated on a front axle or a rear axle, or a driven axle or non-driven axle, in the vehicle, especially by comparing the detected rotational speed or frequency with a predetermined calculated rotational speed or frequency and/or the rotational speed/frequency of other tires.

In addition to the first receiver for receiving the parameter set, a second receiver can be assigned to or integrated in the universal monitoring device according to an embodiment in accordance with the invention, which second receiver is designed for receiving control signals from a transmitting apparatus of the vehicle. Furthermore, at least one functional module for controlling the second receiver and for processing the control signals received therefrom is advantageously provided in this case. The second receiver can differ from the first receiver for example with respect to its receiving frequency, signal amplitude or its modulation or demodulation process. It is obviously also possible that both the receiving of the parameter set and also the receiving of the control signals from a transmission apparatus of the vehicle is performed by one and the same receiver.

In contrast to the program (master software) stored in the memory of the monitoring device and executable by the control apparatus, the received parameter set that is stored in the memory can be free from a program that is executable by the control apparatus or free from program code that is executable by the control apparatus, and thus only comprise parameters which determine the behaviour of the individual functional modules, and especially contain further information or state values.

A method in accordance with the invention for the configuration of a universal monitoring device for monitoring one or several state variables of a vehicle tire provides the transmission of a parameter set by means of a configuration device in a wireless or wire-bound manner to the control apparatus of the monitoring device, as well as the storage of the parameter set in the memory of the monitoring device, wherein the computer program subsequently activates or deactivates one or several of a plurality of functional modules provided therein depending on parameters of the stored parameter set, wherein the functional modules change the content and the coding of the signal transmitted by the transmitter depending on their activation or deactivation and depending on parameters of the stored parameter set.

The invention will be described below in closer detail by reference to an embodiment shown by way of example and in the drawings, wherein.

Figure 1:
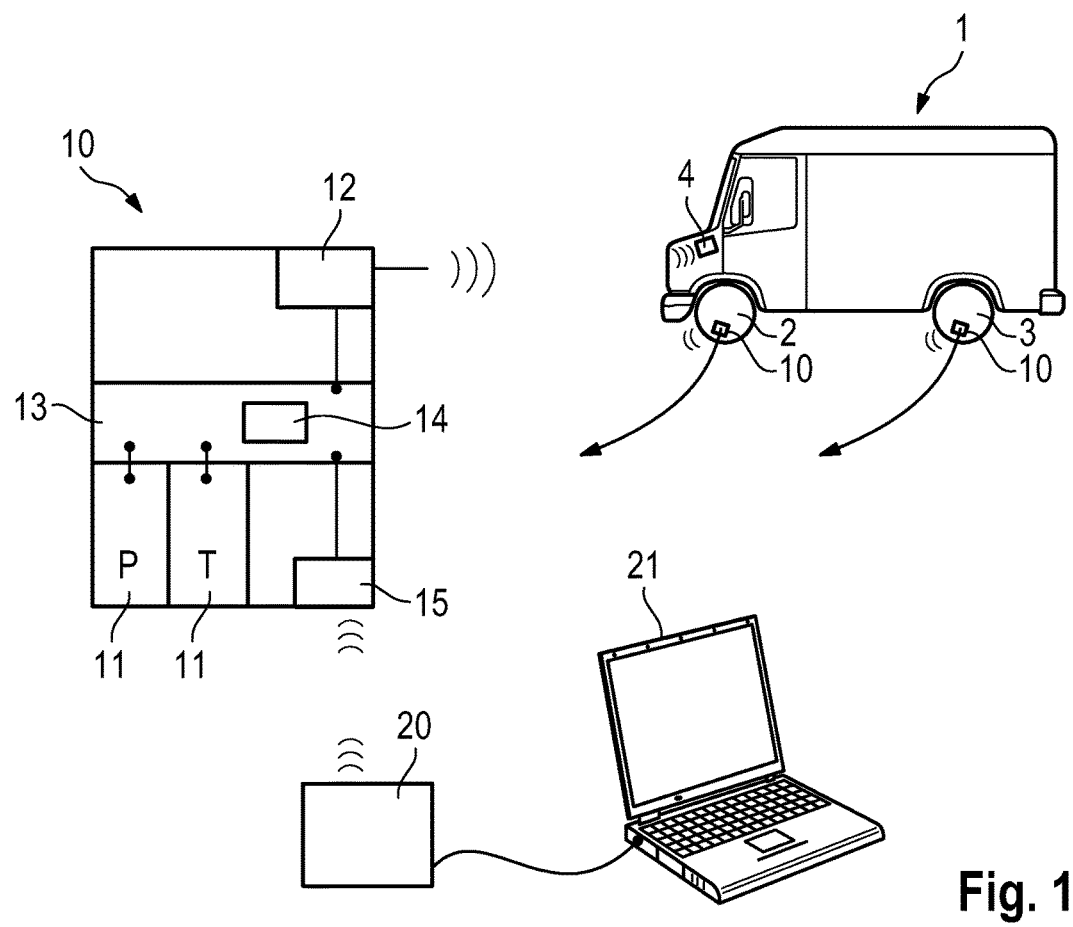
FIG. 1 shows a schematic view of a monitoring device in accordance with the invention and its use.

FIG. 1 schematically shows the use of a monitoring device in accordance with the invention. A plurality of different tires of a vehicle 1 are provided by the monitoring device in accordance with the invention, i.e. a monitoring device 10 in a tire of the front wheel 2 and a monitoring device 10 and a tire of the rear wheel 3.

The monitoring devices 10 respectively detect at least one state variable in the tires of the front wheels 2 and the rear wheels 3, and transmit a respective signal to a receiving device 4 in the vehicle 1, which can evaluate the received signals and can store them in the vehicle control unit and/or signal them to a driver.

A monitoring device 10 in the vehicle tire is further shown in FIG. 1 on a slightly enlarged scale, wherein individual components can be recognised. The monitoring device 10 thus comprises at least one sensor 11 for detecting a state variable of the vehicle tire. An embodiment with two sensors 11 is shown in the present case, of which one detects the air pressure in the vehicle tire and the other detects the temperature of the vehicle tire. Both state variables could also be detected by one and the same sensor.

A transmitter 12 is further provided, which depending on the detected pressure and the detected temperature transmits a signal to the receiving device 4 in the vehicle 1.

A control apparatus 13, which comprises a memory 14, is provided for controlling the detection of the pressure and the temperature as well as the transmission of the signal. Its content will be discussed below in closer detail by reference to FIG. 2.

The monitoring device 10 further comprises a receiver 15 which receives a parameter set from a configuration device 20 which is connected to a computer 21 for example. A parameter set which is adjusted to the use of the monitoring device 10 in the vehicle 1 can be produced from a database by means of the computer 21 and can be transmitted by means of the configuration device 20 to the receiver 15 in a wireless or wire-bound manner, so that the parameter set is stored in the memory 14. The transmission of the complete parameter set, which according to one embodiment always has the same length in the same format, which is not mandatory however, requires only a few seconds, especially even less than 1 second.

Figure 2:
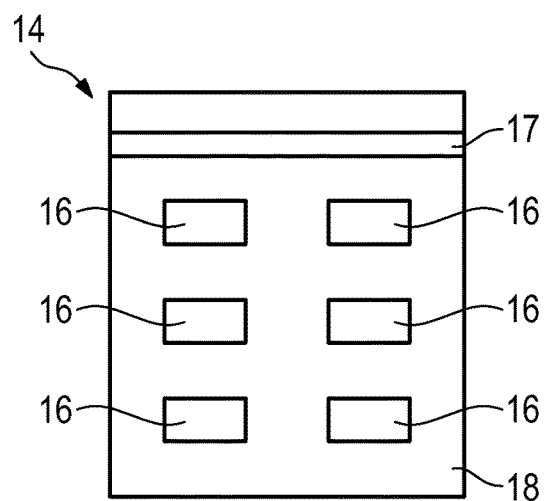
FIG. 2 shows a schematic view of the memory content of the monitoring device in accordance with the invention.

FIG. 2 schematically shows the content of the memory 14 by way of example. A computer program 18 thus stored in the memory 14 at first, which computer program can be executed by the control apparatus 13 (not shown in FIG. 2). It comprises a number of functional modules 16. A parameter set 17 is further stored in the memory 14. It is read by the control apparatus 13 during operation of the monitoring device or also only during an installation routine of the same, whereupon it activates or deactivates individual functional modules 16 according to the operating mode of the computer program 18 and adjusts the behaviour of the individual functional modules 16 depending on the parameter set 17.

If for example a functional module 16 is provided for controlling the signal coding and physical signal properties, said functional module can optionally determine, by means of individual sub-functions, the structural configuration of the signal (coding), e.g. the length and the structure of a preamble, the length of a serial number and the order of the individual different information such as pressure value, temperature value and/or status within the signal. At the same time, the technical interface between the monitoring device 10 and the receiving device 4 in the vehicle 1 can be defined in closer detail, e.g. by predetermining the type of modulation, the transmission speed (bit transmission speed) and the frequency of the signal.

If further a functional module 16 is provided for example for controlling the detection of the air pressure by the sensor 11 (see FIG. 1), said functional module 16 can be activated by an associated parameter in the parameter set 17, and further parameters in the parameter set 17 can describe the interval in which the pressure measurement is to be performed, e.g. every 5 seconds. If desired, limit values for the pressure measurement can further be transferred in order to determine whether a measured pressure has reached or exceeded the limit value and whether the detection interval of the pressure and/or a transmission interval of the pressure information to the receiving device 4 in the vehicle thus needs to be changed, and/or whether a warning signal needs to be output.

A further parameter in the parameter set 17 can determine for example how many bits are available for the pressure value in the signal. This information can either be used in the functional module 16 for controlling the detection of the air pressure and the transmission of a pressure value dependent thereon, or for the different detected state variables in a functional module, which determines the coding of the signal as described above.

In addition to the detection of individual state variables and the structure of the parameters assigned to the signal, the parameter set 17 also comprise further information such as an identification code and/or a serial number of the monitoring device or other tire-specific quantities that can be input by means of the computer 21, e.g. the current tread depth or other information.

The invention claimed is:

1. A universal monitoring device for monitoring one or several state variables of a vehicle tire, comprising;
    at least one sensor for detecting a state variable of the vehicle tire;
    at least one transmitter for transmitting a wireless coded signal depending on the detected state variable;
    at least one control apparatus which is in connection with the sensor and the transmitter in order to control the detection of the state variable and the transmission of the signal, wherein a memory is assigned to the control apparatus or is integrated therein, in which a computer program which is executable by the control apparatus is stored, which controls the detection of the state variable and the transmission of the signal;
    wherein the computer program comprises a plurality of functional modules that are activated individually or activated commonly in groups, prior to transmitting a wireless coded signal by the at least one transmitter, the plurality of functional modules being designed to change the content and the coding of the signal to be transmitted depending on their activation or deactivation;
    the control apparatus is assigned a receiver for receiving a parameter set; and
    the memory is designed for storing the parameter set received by the receiver, and the computer program is designed to activate and deactivate its functional modules depending on parameters of the stored parameter set, and to determine the change in the content and the coding of the signal to be transmitted by the functional modules depending on parameters of the stored parameter set.

2. A universal monitoring device according to claim 1, wherein the computer program is designed to always activate at least two of its functional modules depending on the stored parameter set.

3. A universal monitoring device according to claim 1, wherein different functional modules are provided that are configured to be activated and deactivated individually, each of which is designed to control the detection of a different state variable in the vehicle tire and the transmission of a value dependent thereon in the signal, so that by activating a functional module the monitoring of one of a plurality of potential state variables of the vehicle tire can be determined.

4. A universal monitoring device according to claim 1, wherein the parameter set comprises one or several parameters which determine a bit position of a value of a state variable detected by the sensor in the signal to be transmitted.

5. A universal monitoring device according to claim 1, wherein the parameter set comprises one or several parameters which determine the bit length of a value of a state variable detected by the sensor in the signal to be transmitted.

6. A universal monitoring device according to claim 1, wherein the parameter set comprises one or several parameters which determine a transmission interval and/or a bit transmission speed of the signal to be transmitted.

7. A universal monitoring device according to claim 1, wherein the parameter set comprises one or several parameters which determine a detection interval for detecting a state variable by means of the sensor.

8. A universal monitoring device according to claim 1, wherein the functional modules comprise one or more of the following function modules:
    a functional module for controlling the detection of the air pressure in the vehicle tire and the transmission of a pressure value that is dependent thereon;
    a functional module for controlling the detection of a temperature in the vehicle tire and the transmission of a temperature value dependent thereon;
    a functional module for controlling the power output of an electrical battery integrated in the monitoring device;
    a functional module for controlling a time recording;
    a functional module for controlling the coding, the transmission interval, the bit transmission speed and/or the modulation of the signal to be transmitted; and
    a functional module for controlling the transmission of state values, identification values and/or limit values for the state variable which are stored in the parameter set.

9. A universal monitoring device according to claim 1, wherein an acceleration sensor is assigned to the monitoring device or is integrated therein, which sensor detects the direction of an acceleration of the monitoring device, and the functional modules comprise a functional module for controlling the detection of the acceleration direction by the acceleration sensor and for transmitting a value dependent thereon by means of the transmitter.

10. A universal monitoring device according to claim 1, wherein a second receiver is assigned to the monitoring device or is integrated therein, which receiver is designed for receiving control signals from a transmission apparatus of the vehicle, and the functional modules comprise a functional module for controlling the second receiver and for processing the control signals received by said receiver.

11. A universal monitoring device according to claim 1, wherein the parameter set stored in the memory does not include a program that is executable by the control apparatus.

12. A computer-implemented method for the configuration of a universal monitoring device for monitoring one or several state variables of a vehicle tire, the method comprising;
    storing, in memory of a control apparatus of the universal monitoring device, a plurality of functional modules, wherein the control apparatus is communicatively coupled to a transmitter;
    receiving, by a receiver of the universal monitoring device, a parameter set via a wireless or wire-bound connection;

activating or deactivating an individual functional module or commonly a group of functional modules, of the plurality of functional modules stored in the memory of the control apparatus, in response to the received parameter set, wherein the control apparatus is configured to control the content and the coding of a coded signal to be transmitted by the transmitter in response to the activation or deactivation of the individual functional module or commonly the group of functional modules.

13. A method according to claim 12, wherein activating or deactivating an individual functional module or commonly a group of functional modules comprises activating at least two of the plurality of functional modules in response to the received parameter set.

14. A method according to claim 12, further comprising changing, in the coded signal, a bit position corresponding to at least one value of at least one state variable detected by the sensor in response to the received parameter set.

15. A method according to claim 12, further comprising changing, in the coded signal, a bit length corresponding to at least one value of at least one state variable detected by sensor in response to the received parameter set.

16. A method according to claim 12, further comprising changing a transmission interval and/or a bit transmission speed of the coded signal in response to the received parameter set.

17. A method according to claim 12, further comprising changing a detection interval for detecting a state variable by a sensor in response to the received parameter set.

18. A universal monitoring device according to claim 2, wherein each functional module of the plurality of functional modules is designed to control the detection of a different state variable in the vehicle tire and the transmission of a value dependent thereon in the signal.

19. A universal monitoring device according to claim 2, wherein the parameter set comprises one or several parameters which determine the position of a value of a state variable detected by the sensor in the signal to be transmitted.

20. A universal monitoring device according to claim 3, wherein the parameter set comprises one or several parameters which determine the position of a value of a state variable detected by the sensor in the signal to be transmitted.

* * * * *